United States Patent
Moriyama

(10) Patent No.: US 9,270,151 B2
(45) Date of Patent: Feb. 23, 2016

(54) STARTER

(75) Inventor: Noriaki Moriyama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 281 days.

(21) Appl. No.: 13/817,027

(22) PCT Filed: Nov. 16, 2010

(86) PCT No.: PCT/JP2010/070364
§ 371 (c)(1),
(2), (4) Date: Feb. 14, 2013

(87) PCT Pub. No.: WO2012/066632
PCT Pub. Date: May 24, 2012

(65) Prior Publication Data
US 2013/0140928 A1    Jun. 6, 2013

(51) Int. Cl.
*H02K 7/108* (2006.01)
*F02N 15/02* (2006.01)
*F02N 15/06* (2006.01)

(52) U.S. Cl.
CPC .............. *H02K 7/108* (2013.01); *F02N 15/067* (2013.01)

(58) Field of Classification Search
CPC .............................. F02N 15/067; H02K 7/108
USPC ........................................ 310/78; 74/7 A, 7 E
See application file for complete search history.

(56) References Cited

U.S. PATENT DOCUMENTS

| | | | | | |
|---|---|---|---|---|---|
| 2,745,997 | A | * | 5/1956 | Wessel | 318/102 |
| 3,283,595 | A | * | 11/1966 | Inagaki | 74/7 R |
| 3,299,719 | A | * | 1/1967 | Toulier | 74/7 R |
| 3,603,803 | A | * | 9/1971 | Bowcott | 290/38 A |
| 4,116,077 | A | * | 9/1978 | Mazzorana | 74/7 A |
| 4,149,424 | A | * | 4/1979 | Bowcott | 74/7 A |
| 4,579,010 | A | * | 4/1986 | Colvin et al. | 74/7 A |
| 5,131,204 | A | * | 7/1992 | Hiendl | 52/848 |
| 5,341,697 | A | * | 8/1994 | Isozumi | 74/7 A |
| 5,367,913 | A | * | 11/1994 | Yumiyama et al. | 74/7 A |
| 5,777,393 | A | * | 7/1998 | Katoh et al. | 290/48 |
| 5,848,551 | A | | 12/1998 | Ohmi et al. | |
| 6,202,497 | B1 | * | 3/2001 | Kuragaki et al. | 74/7 A |

(Continued)

FOREIGN PATENT DOCUMENTS

| | | |
|---|---|---|
| JP | 48-31766 Y | 9/1973 |
| JP | 48-64412 A | 9/1973 |

(Continued)

OTHER PUBLICATIONS

Translation of foreign document JP 48064412 (Year: 1973).*
International Search Report for PCT/JP2010/070364 dated Dec. 28, 2010.

(Continued)

*Primary Examiner* — Alex W Mok
(74) *Attorney, Agent, or Firm* — Sughrue Mion, PLLC

(57) ABSTRACT

A starter which includes a shift piece that is relatively rotatably fitted to a groove (6) of a clutch and is also relatively rotatably coupled with a straddle portion of a shift lever (9), for joining the clutch and the shift lever together, so that a pinion gear is engaged with or released from a ring gear by a reciprocal movement of the clutch that is in conjunction with pivotal seesaw motion of the shift lever (9), wherein the shift piece is configured separately by a ring-like shift piece (7) mounting to the groove (6) of the clutch and a shift piece B (8) mounting to the shift lever, which are mounted in a form coupled together.

9 Claims, 3 Drawing Sheets

(56) References Cited

U.S. PATENT DOCUMENTS

| | | | |
|---|---|---|---|
| 2002/0069712 A1* | 6/2002 | Imanishi et al. | 74/7 A |
| 2006/0137416 A1* | 6/2006 | Chang | 70/417 |
| 2006/0266137 A1* | 11/2006 | Usami et al. | 74/6 |
| 2007/0068288 A1* | 3/2007 | Hasegawa et al. | 74/7 A |
| 2007/0137325 A1* | 6/2007 | Murase et al. | 74/7 E |
| 2008/0098850 A1* | 5/2008 | Hasegawa et al. | 74/7 E |
| 2008/0168861 A1* | 7/2008 | Teixeira et al. | 74/7 R |
| 2009/0032148 A1* | 2/2009 | Kozuma et al. | 148/330 |
| 2009/0048536 A1* | 2/2009 | Freeman et al. | 600/583 |
| 2009/0133531 A1* | 5/2009 | Ono et al. | 74/7 C |
| 2010/0264765 A1* | 10/2010 | Haruno et al. | 310/71 |
| 2010/0271155 A1* | 10/2010 | Kaneda et al. | 335/126 |

FOREIGN PATENT DOCUMENTS

| | | | | |
|---|---|---|---|---|
| JP | 4864412 A | 9/1973 | | |
| JP | 55-107067 A | 8/1980 | | |
| JP | 02263947 A | * 10/1990 | | C22C 33/02 |
| JP | 5-52167 A | 3/1993 | | |
| JP | 5-280450 A | 10/1993 | | |
| JP | 9-236070 A | 9/1997 | | |
| JP | 2005-133606 A | 5/2005 | | |

OTHER PUBLICATIONS

Communication dated Dec. 12, 2014 from the State Intellectual Property Office of the People's Republic of China in counterpart Application No. 201080069194.0.

* cited by examiner

STARTER

CROSS REFERENCE TO RELATED APPLICATIONS

This application is a National Stage of International Application No. PCT/JP2010/070364 filed Nov. 16, 2010, the contents of which are incorporated herein by reference in their entirety.

TECHNICAL FIELD

This invention relates to a starter in which a shift lever makes its pivotal seesaw motion in conjunction with a reciprocating movement of a plunger of an electromagnetic switch, so that a pinion gear is engaged with or released from a ring gear.

BACKGROUND ART

There is a starter shown in, for example, Patent Document 1, as a conventional one in which a shift lever makes its pivotal seesaw motion in conjunction with a reciprocal movement of a plunger of an electromagnetic switch, so that a pinion gear is engaged with or released from a ring gear.

As shown in FIG. 8, the starter disclosed in Patent Document 1 is configured such that a straddle portion of a shift lever SL straddles along and over a groove of a clutch; and that a link between the straddle portion of the shift lever and the groove of the clutch, in order to smoothly reciprocate the clutch by the shift lever under pivotal seesaw motion and also to prevent a linked portion of the radially rotating clutch from being excessively abraded due to sliding friction with both end faces of the groove, is established in such a manner of attaching to both end portions of the straddle portion of the shift lever SL, shift pieces SP each rotatable relative to the end portion, so that the straddle portion is joined via the shift pieces SP to the groove of the clutch.

Meanwhile, there is a starter shown in, for example, Patent Document 2, as another conventional one. As shown in FIG. 9, the starter disclosed in Patent Document 2 is configured by disposing on the groove of the clutch a shift piece RP that is ring like and has fitting portions relatively rotatably fittable to a shift lever, and by mounting the shift lever SL to the fitting portions of the shift piece RP for joining together.

CITATION LIST

Patent Documents

Patent Document 1: Japanese Utility Model Application Laid-open No. S48 (1973)-31766
Patent Document 2: Japanese Patent Application Laid-open No. S55 (1980)-107067

SUMMARY OF THE INVENTION

Problems to be Solved by the Invention

In the case of the conventional configuration shown in Patent Document 1, when the shift lever and the shift pieces are mounted to the groove of the clutch, it is not necessary to elastically deform the shift lever and the shift pieces. This allows the use of such a shift lever and shift pieces made of, for example, a heat treated steel, and thus, there is a merit that it is easier to downsize the shift lever and the shift pieces while ensuring their respective mechanical strengths and abrasion resistances. In this instance, however, there are drawbacks in efficiency of assembly work, that is, before mounting to the groove, care should be taken to prevent the shift pieces from being dropped off the shift lever, or other component parts should be used to retain the respective shift pieces on the shift lever for preventing the shift pieces from being dropped off.

Meanwhile, in the case of the conventional starter shown in Patent Document 2, because the shift piece is ring like thus making it easier to ensure increased contact area with both end faces of the groove of the clutch, there is a merit that a less abrasion resistance and less expensive material, such as a resin material, is usable for the shift piece. However, in order to ensure contact area without excessive increase in size of the ring-like shift piece and the both end faces of groove of the clutch, it is necessary to reduce a clearance between the inner diameter of the ring-like shift piece and the outer diameter of the groove of the clutch.

In this instance, it is necessary to perform mounting of the shift lever to the fitting portions of the ring-like shift piece, by using another cylindrical member for joining them, or while deforming elastically the straddle portion of the shift lever to be pushed apart. Accordingly, there are drawbacks that:

in the former mounting, size increasing is required due to increase in axial width or in radial thickness of the shift piece in order to ensure strength of a portion of the shift piece for supporting the joining member or of the cylindrical joining member; and in the latter mounting, as the material of the shift lever, such a material is not usable that is higher in mechanical strength but is not adaptable to elastically deform work, such as, for example, a heat treated steel or the like, and thus, in order to ensure a similar mechanical strength of the shift lever to that of the above material, growth in size with a elastically deformable material is necessary for the shift lever.

Namely, in the conventional art, when the shift lever as described above that is downsized while ensuring mechanical strength by making it with a heat treated steel or the like, and the ring-like shift piece as described above that is easy to ensure abrasion resistance, are used in combination, it is necessary to increase excessively the size of the ring-like shift piece in order to perform mounting for joining them together.

This invention has been made to solve the problems as described above, and an object thereof is to provide a starter which makes it easier to mount a ring-like shift piece without excessive increase in its size, to a shift lever that is downsized while ensuring mechanical strength by making it with, for example, a heat treated steel.

Means for Solving the Problems

A starter according to the invention, includes: a motor; an electromagnetic switch that turns on/off power supply to the motor; a clutch that transmits rotative force from the motor to a pinion gear to be engaged with a ring gear in an internal combustion engine, and that is reciprocally movable relative to the ring gear; a shift lever that is coupled at its one end portion with a plunger of the electromagnetic switch, and that has a straddle portion in a bifurcated form of its other end portion straddling the clutch; a shift piece for joining the clutch and the shift lever together, that is relatively rotatably fitted to a groove of the clutch, and is also relatively rotatably coupled with the straddle portion of the shift lever;

wherein the shift lever makes its pivotal seesaw motion in conjunction with a reciprocal movement of the plunger, and the pinion gear is engaged with or released from the ring gear by a reciprocal movement of the clutch in conjunction with the pivotal seesaw motion, and wherein the shift piece is configured separately by a ring-like shift piece (shift piece A) on a mounting side to the groove of the clutch, and another shift piece B on a mounting side to the shift lever, the shift piece A and the shift piece B being mounted in a form coupled together.

Effect of the Invention

According to the starter of the invention, it becomes possible to provide a starter which can easily achieve joining and prevent unjoining of the shift lever made of a heat treated steel for ensuring mechanical strength and the shift piece, without a need of excessive setting for the clearance between the inner diameter of the ring-like shift piece (shift piece A) and the outer diameter of the groove of the clutch, and without excessive increase in size of the ring-like shift piece. In addition, it becomes possible to provide a starter which can easily ensure strength necessary to repeatedly reciprocate the clutch, of portions for joining the shift lever and the ring-like shift piece, with less expensive configuration.

The foregoing and other objects, features, aspects and advantages of the present invention will become more apparent from the following detailed description of the embodiments and the accompanying drawings.

MODE FOR CARRYING OUT THE INVENTION

Embodiment 1

Figure 1:
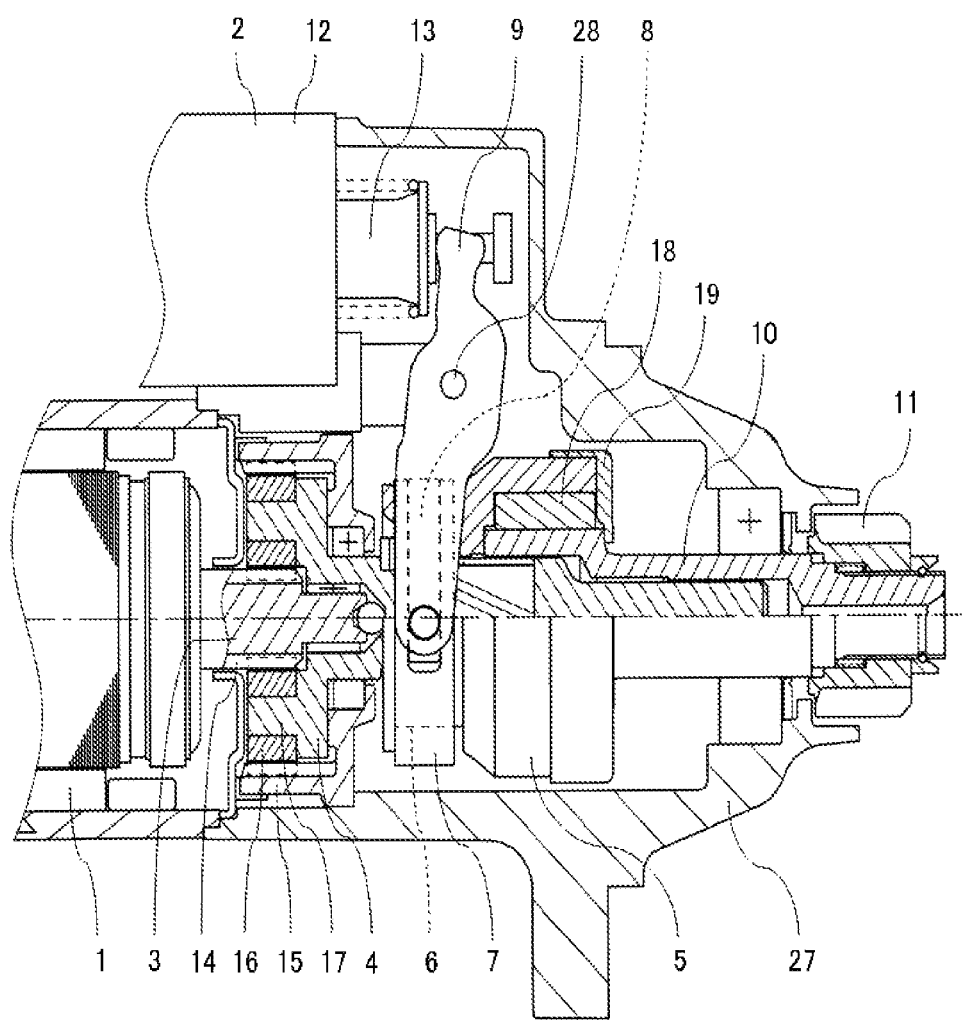
FIG. 1 is a main-part sectional view showing a starter according to Embodiment 1 of the invention.

FIG. 1 is a sectional view showing a main part of a starter according to Embodiment 1 of the invention. In FIG. 1, the starter according to Embodiment 1 of the invention includes, a motor 1; an electromagnetic switch 2 for turning on/off power supply to the motor 1; a power transmission mechanism 4 to which rotative force of a motor shaft 3 is transmitted; a one-way clutch 5 joined with the power transmission mechanism 4; a ring-like shift piece 7 (hereinafter, may be referred to as shift piece A) relatively rotatably mounted to a groove 6 of the clutch 5; a shift piece 8 (hereinafter, may be referred to as shift piece B) joined with and supported by the ring-like shift piece 7; a shift lever 9 disposed over between the clutch 5 and the electromagnetic switch 2 for reciprocating the clutch 5; and a pinion gear 11 axially slidably splined to an end portion of a pinion shaft 10 of the clutch 5. Note that the shift lever 9 is made of a metal material ensuring mechanical strength, for example, a heat treated steel.

As to the electromagnetic switch 2, a plunger 13 that is connected to a movable core (not shown) is projected from a case 12. The plunger 13 works to coordinate with the movable core that is attracted toward a stationary core (not shown) upon excitation by energization of a coil (not shown) in the case 12.

In the power transmission mechanism 4, a sun gear 14 is provided on the motor shaft 3. An internal gear 15 is arranged to surround the sun gear 14. Between the sun gear 14 and the internal gear 15, a plurality of planetary gears 16 that contact internally with the sun gear 14 and externally with the internal gear 15, are arranged as equally spaced in circumferential direction. Portions at one end of a planetary gear shaft 17 rotatably pass through center axes of the respective planetary gears 16. A portion at the other end of the planetary gear shaft 17 is extended along a center axis of the pinion shaft 10 to thereby rotatably support the pinion shaft 10.

In the clutch 5, a plurality of clutch rollers 18 are arranged on the periphery of the pinion shaft 10 as spaced in circumferential direction. One end faces in axial direction of the respective clutch rollers 18 are covered with a clutch cover 19, and circumferences of the respective clutch rollers 18 are covered with a clutch housing.

Figure 2:
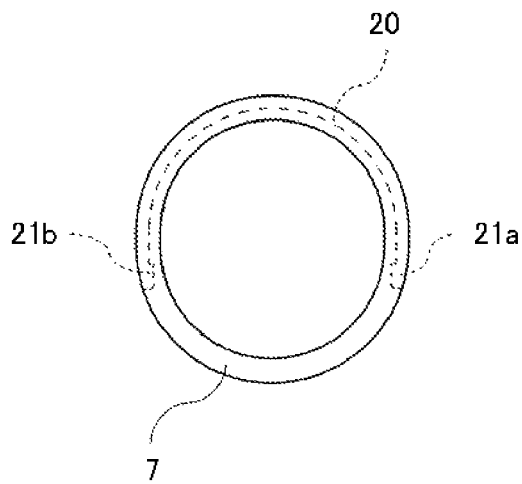
FIG. 2 is a front view showing a ring-like shift piece (shift piece A) in Embodiment 1 of the invention.
Figure 3:
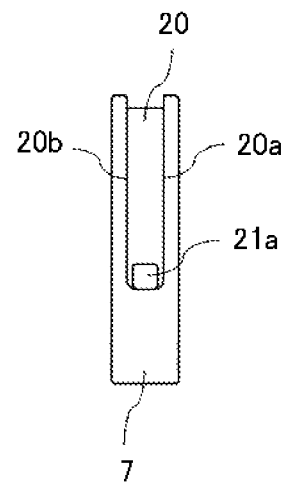
FIG. 3 is a side view showing the ring-like shift piece (shift piece A) in Embodiment 1 of the invention.

FIG. 2 is a front view showing the ring-like shift piece 7 (shift piece A) in FIG. 1, and FIG. 3 is a side view of the ring-like shift piece 7.

In FIG. 2 and FIG. 3, the ring-like shift piece 7 is made of a material that ensures mechanical strength and is a little bit deformable elastically, for example, a glass fiber or carbon fiber-reinforced polyamide resin. On a side portion (peripheral portion) of the ring-like shift piece, there are formed a groove 20 for joining and supporting the shift piece 8 (shift piece B), and latching recesses 21a and 21b for the shift piece 8. The groove 20 has wall faces 20a and 20b.

The ring-like shift piece 7 is relatively rotatably mounted to the groove 6 of the clutch 5.

Figure 4:
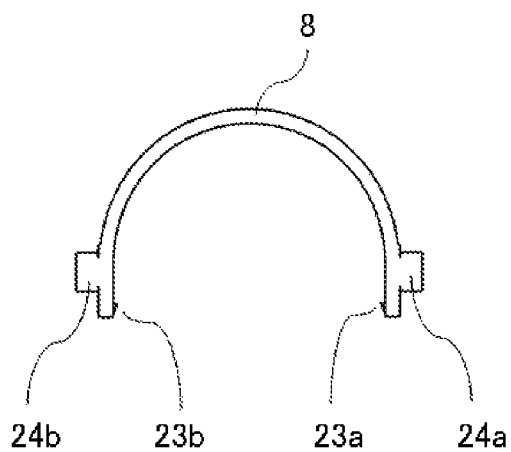
FIG. 4 is a front view showing a shift piece B in Embodiment 1 of the invention.
Figure 5:
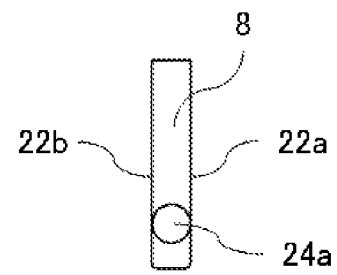
FIG. 5 is a side view showing the shift piece B in Embodiment 1 of the invention.

FIG. 4 is a front view showing the shift piece 8 (shift piece B) in FIG. 1, and FIG. 5 is a side view of the shift piece 8.

In FIG. 4 and FIG. 5, the shift piece 8 is made of a material that ensures mechanical strength and is elastically deformable just to the extent possible to mount to the shift lever 9, for example, a glass fiber or carbon fiber-reinforced polyamide resin. Here, shown at numerals 22a and 22b are lateral side portions of the shift piece 8, at 23a and 23b are latching protrusions to be coupled with the latching recesses 21a and 21b of the ring-like shift piece 7, and at 24a and 24b are joining portions to the shift lever 9.

Figure 6:
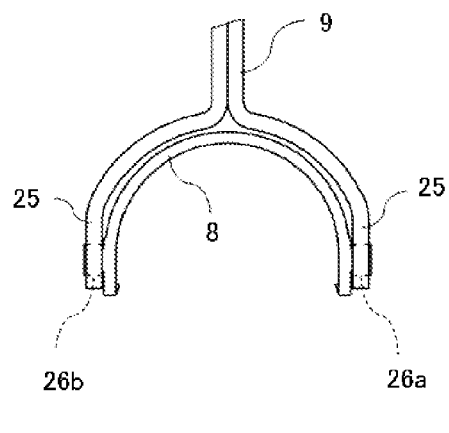
FIG. 6 is a front view showing a shift lever assembly in which the shift piece B is mounted to a shift lever, in Embodiment 1 of the invention

FIG. 6 is a front view showing a shift lever assembly in which the shift piece 8 is mounted to the shift lever 9. The shift lever 9 has holes 26a and 26b on a straddle portion 25, and the shift piece 8 is relatively rotatably mounted to the shift lever 9 by coupling the joining portions 24a and 24b of the shift piece 8 with the holes 26a and 26b.

Figure 7:
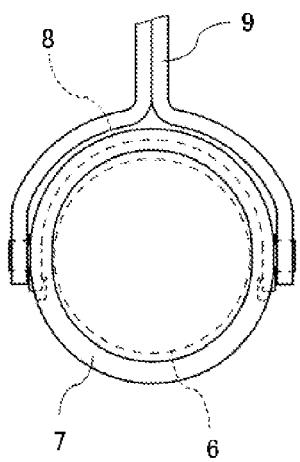
FIG. 7 is a main-part sectional view showing a state in which the shift lever assembly is mounted to the shift piece A, in Embodiment 1 of the invention.
Figure 8:
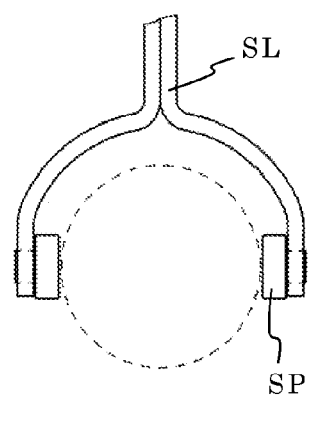
FIG. 8 is a front view showing an example of the conventional art.
Figure 9:
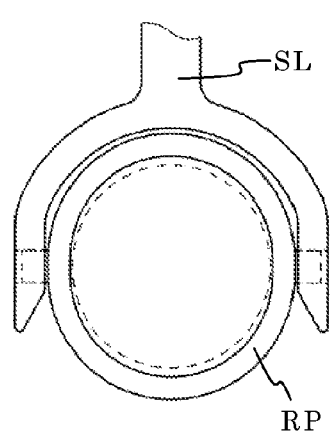
FIG. 9 is a front view showing another example of the conventional art.

FIG. 7 is a front view showing a state in which the shift lever assembly in FIG. 6 is mounted to the ring-like shift piece 7 in FIG. 2. At the time of this mounting, it is just enough that a sum of an elastically inwardly deformed amount of the ring-like shift piece 7 and an elastically outwardly deformed amount of the shift piece 8, corresponds to the height of the latching protrusion 23a or 23b of the shift piece 8, and thus, the mounting can easily be performed.

In addition, the shift lever 9 is, in a state of being installed in a starter housing 27, positionally supported by a pivotal support member 28, and for its other side where the clutch 5 is placed, the clutch 5 is supported by the power transmission mechanism 4. Thus, when the starter operates, there is a little force to separate off the shift piece 8 from the ring-like shift piece 7, and therefore, it suffices that the latching protrusions 23a and 23b surely have a height capable of just withstanding the force.

Next, the operation of the starter with the above configuration, will be described.

When a key switch (not shown) is turned on, the coil (not shown) of the electromagnetic switch 2 is excited, so that the movable core is attracted toward the stator core, thereby causing the plunger 13 to move to the left in FIG. 1. With this motion of the plunger 13, the shift lever 9 makes its pivotal seesaw movement about the pivotal support member 28, and the straddle portion 25 of the shift lever 9 pivots in counterclockwise direction. This causes the lateral side portion 22a on the side of the pinion gear 11 of the shift piece 8, to push the wall face 20a of the groove 20 of the ring-like shift piece 7, so that the ring-like shift piece 7 pushes a pinion-side wall face of the groove 6 of the clutch 5, to push out the clutch 5 to the right in FIG. 1, whereby the pinion gear 11 is engaged with a ring gear (not shown) of an internal combustion engine.

With this operation, the electromagnetic switch 2 is activated to drive the motor 1 causing the motor shaft 3 to rotate. With the rotation of the motor shaft 3, each planetary gears 16 orbits, while spinning, around the sum gear 14 as a center. With the orbiting of the planetary gear 16, the planetary gear shaft 17, the pinion shaft 10 and the pinion gear 11 rotate, causing the ring gear engaged with the pinion gear 11 to rotate, to start the internal combustion engine.

Thereafter, when the key switch is made open, energization of the coil is turned off to release the movable core from a stationary core, so that the plunger 13 moves to project from the case 12, causing the shift lever 9 to makes its pivotal seesaw motion about the pivotal support member 28 and the straddle portion 25 of the shift lever 9 to pivot in clockwise direction. Subsequently, the pinion-opposite-side lateral side portion 22b of the shift piece 8 is caused to push the pinion-opposite-side wall face 20b of the groove 20 of the ring-like shift piece 7, so that the ring-like shift piece 7 pushes the pinion-opposite-side wall face of the groove 6 of the clutch 5, whereby the clutch 5 and the pinion gear 11 move in a direction away from the ring gear, to release the pinion gear 11 and the ring gear from engagement.

As described above, according to the starter in Embodiment 1 of the invention, it becomes easy to couple the shift piece 8 that is relatively rotatably mounted to the shift lever 9, with the ring-like shift piece 7 that is relatively rotatably mounted to the groove 6 of the clutch 5. In addition, due to the pivotal seesaw motion of the shift lever 9, collision and pushing will repeatedly occur between the wall face 20a of the groove of the ring-like shift piece 7 and the lateral side portion 22a of the shift piece 8, and between the wall face 20b and the lateral side portion 22b; however, because it is achievable for the wall face 20a and the lateral side portion 22a and for the wall face 20b and the lateral side portion 22b, to respectively have contact areas extending about half around the ring-like shift piece 7, it becomes easy to ensure their sizes that suppress a surface pressure to within the withstand value against the load due to each collision and pushing.

Further, by forming the shift piece 8 as a resin mold product, it becomes possible to fabricate it as integrally molded one including the latching protrusions 23a, 23b and the joining portions 24a, 24b to the shift lever 9, as well as the lateral side portions 22a,22b, so that ease of fabricating of the component is achieved.

Consequently, according to the starter in Embodiment 1 of the invention, it becomes possible to provide a starter which is easy to achieve joining and to prevent unjoining of the shift lever made of a heat treated steel for ensuring mechanical strength and the shift piece, without a need of excessive setting for the clearance between the inner diameter of the ring-like shift piece (shift piece A) and the outer diameter of the groove of the clutch, and without excessive increase in size of the ring-like shift piece; in addition, which can easily ensure the strength necessary to repeatedly reciprocate the clutch, of the portions for joining the shift lever and the ring-like shift piece, with less expensive configuration.

INDUSTRIAL APPLICABILITY

This invention is suitably applied to a starter in which a shift lever makes its pivotal seesaw motion in conjunction with a reciprocating movement of a plunger of an electromagnetic switch, so that a pinion gear is engaged with or released from a ring gear.

DESCRIPTION OF REFERENCE NUMERALS AND SIGNS

1; motor, 2; electromagnetic switch, 3; motor shaft, 4; power transmission mechanism, 5; clutch, 6; groove of clutch, 6a,6b; wall faces, 7; ring-like shift piece (shift piece A), 8; shift piece (shift piece B), 9; shift lever, 10; pinion shaft, 11; pinion gear, 12; case, 13; plunger, 14; sun gear, 15; internal gear, 16; planetary gear, 17; planetary gear shaft, 18; clutch roller, 19; clutch cover, 20; groove, 20a,20b; wall faces, 21a,21b; latching recesses, 22a,22b; lateral side portions, 23a,23b; latching protrusions, 24a,24b; joining portions, 25; straddle portion, 26a,26b; holes, 27; starter housing, 28; pivotal support member.

The invention claimed is:
1. A starter comprising:
a motor;
an electromagnetic switch that turns on/off power supply to the motor;
a clutch that transmits rotative force from the motor to a pinion gear to be engaged with a ring gear in an internal combustion engine, and that is reciprocally movable relative to the ring gear;
a shift lever that is coupled at its one end portion with a plunger of the electromagnetic switch, and that has a straddle portion in a bifurcated form of its other end portion straddling the clutch;
a shift piece for joining the clutch and the shift lever together, that is relatively rotatably fitted to a groove of the clutch, and is also relatively rotatably coupled with the straddle portion of the shift lever;
wherein the shift lever makes its pivotal seesaw motion in conjunction with a reciprocal movement of the plunger, and the pinion gear is engaged with or released from the ring gear by a reciprocal movement of the clutch in conjunction with the pivotal seesaw motion, and
wherein the shift piece is configured separately by a ring-like shift piece (shift piece A) mounting to the groove of the clutch, and another shift piece B mounting to the shift lever, the shift piece A and the shift piece B being mounted in a form coupled together,
wherein shift piece B continuously extends at least halfway around a circumference of the ring-like shift piece (shift piece A),
wherein the ring-like shift piece has a groove formed on its ring-like circumference portion for joining and support- ing the shift piece B and a latching recess for the shift piece B formed on the groove, wherein the groove has a first wall face and a second wall face opposite the first wall face extending along its ring-like circumference portion, wherein the shift piece B has a first lateral side portion and second lateral side portion, and wherein the first wall face and the first lateral side portion are configured to respectively contact with and push against each other, and the second wall face and the second lateral side portion are configured to respectively contact with and push against each other.

2. The starter of claim 1, wherein the ring-like shift piece is made of a resin.

3. The starter of claim 2, wherein the shift lever is made of a metal.

4. The starter of claim 2, wherein the shift lever is made of a reinforced steel by heat treatment.

5. The starter of claim 1, wherein the shift piece B is made of a resin, and has a lateral side portion fitted to a groove of the ring-like shift piece and a latching protrusion coupled with a latching recess of the ring-like shift piece, and is shaped to include a joining portion to the shift lever.

6. The starter of claim 5, wherein the shift lever is made of a metal.

7. The starter of claim 5, wherein the shift lever is made of a reinforced steel by heat treatment.

8. The starter of claim 1, wherein the shift lever is made of a metal.

9. The starter of claim 1, wherein the shift lever is made of a reinforced steel by heat treatment.

\* \* \* \* \*